(12) United States Patent
Yang et al.

(10) Patent No.: US 12,623,906 B2
(45) Date of Patent: May 12, 2026

(54) PREPARATION METHOD OF MULTIPLE CARBON-COATED HIGH-COMPACTION LITHIUM IRON MANGANESE PHOSPHATE

(71) Applicant: HUBEI RT ADVANCED MATERIALS GROUP COMPANY LIMITED, Huangshi (CN)

(72) Inventors: Ji Yang, Huangshi (CN); Yihua Wei, Huangshi (CN); Jie Sun, Huangshi (CN); Zhonglin He, Huangshi (CN); Jianhao He, Huangshi (CN); Rong Luo, Huangshi (CN); Wenzhi Jiang, Huangshi (CN); Nan Jiang, Huangshi (CN); Guangchun Cheng, Huangshi (CN); Haijuan Liu, Huangshi (CN); Ya He, Huangshi (CN)

(73) Assignee: HUBEI RT ADVANCED MATERIALS GROUP COMPANY LIMITED, Huangshi (CN)

( * ) Notice: Subject to any disclaimer, the term of this patent is extended or adjusted under 35 U.S.C. 154(b) by 668 days.

(21) Appl. No.: 17/979,796

(22) Filed: Nov. 3, 2022

(65) Prior Publication Data

US 2023/0045821 A1 Feb. 16, 2023

(30) Foreign Application Priority Data

May 25, 2022 (CN) .......................... 202210579213.9
Aug. 2, 2022 (CN) .......................... 202210923927.7

(51) Int. Cl.
*C01B 25/45* (2006.01)
*H01M 4/36* (2006.01)
(Continued)

(52) U.S. Cl.
CPC ............. *C01B 25/45* (2013.01); *H01M 4/366* (2013.01); *H01M 4/5825* (2013.01);
(Continued)

(58) Field of Classification Search
None
See application file for complete search history.

(56) References Cited

U.S. PATENT DOCUMENTS

2001/0021472 A1 9/2001 Barker
2010/0202951 A1 8/2010 Wu
2014/0127111 A1 5/2014 Tahara

FOREIGN PATENT DOCUMENTS

CN 114804056 A * 7/2022 ............. C01B 25/45

OTHER PUBLICATIONS

Machine translation of Jiang et al., CN 114804056A (Year: 2022).*

* cited by examiner

*Primary Examiner* — Keling Zhang
(74) *Attorney, Agent, or Firm* — Hemisphere Law, PLLC

(57) ABSTRACT

The present disclosure belongs to the technical field of lithium battery cathode materials, and discloses a preparation method of multiple carbon-coated high-compaction lithium iron manganese phosphate, comprising the following steps: (1) synthesizing a carbon and vanadium co-doped ferromanganese phosphate precursor through a co-precipitation method, sintering, and removing crystal water to obtain an anhydrous ferromanganese phosphate precursor; (2) adding lithium phosphate, a supplemental phosphorus source, an organic carbon source, a dopant and deionized water, and performing ball milling, wet sanding, spray drying and sintering to obtain an intermediate material; and (3) adding deionized water and the organic carbon source, then performing ball milling, sanding, spray drying, sintering and air jet pulverization to obtain multiple carbon-coated high-compaction lithium iron manganese phosphate.

6 Claims, 5 Drawing Sheets

(51) Int. Cl.
  *H01M 4/58* (2010.01)
  *H01M 4/587* (2010.01)
  *H01M 4/02* (2006.01)

(52) U.S. Cl.
  CPC ......... *H01M 4/587* (2013.01); *C01P 2002/72*
  (2013.01); *C01P 2006/40* (2013.01); *H01M*
  *2004/028* (2013.01)

2Theta(deg.)

PREPARATION METHOD OF MULTIPLE CARBON-COATED HIGH-COMPACTION LITHIUM IRON MANGANESE PHOSPHATE

TECHNICAL FIELD

The present disclosure belongs to the technical field of lithium battery cathode materials, and particularly relates to a preparation method of multiple carbon-coated high-compaction lithium iron manganese phosphate.

BACKGROUND

At present, a novel lithium battery cathode material is developed around high-voltage platforms and manganese-based materials, and the earliest commercialized lithium battery cathode material in its branch system is lithium manganese iron phosphate which has high voltage, high energy density and excellent low temperature property relative to lithium iron phosphate; and has low cost, high safety and long cycle life relative to a ternary material.

Lithium manganese iron phosphate itself has performance deficiency. At the stage of wet grinding, a variety of phases are mixed in a proportion, but the uniform mixing effect is difficult to achieve since there are differences in the aspects of particle morphology and looseness, so as to result in poor uniformity of the finally produced lithium manganese iron phosphate finished product phase; due to no consecutive coplanar octahedral network in its structure, movement of lithium ions in a one-dimensional channel is limited, leading to poor material conductivity.

SUMMARY

In order to solve the drawbacks in the prior art, the objective of the present disclosure is to provide a preparation method of a multiple carbon-coated high-compaction lithium iron manganese phosphate material. The multiple carbon-coated high-compaction lithium iron manganese phosphate material is uniform in phase, better and denser in carbon coating effect, more uniform in doping and better in conductivity.

In order to realize the above objective, the present disclosure adopts the following technical solution:

Provided is a preparation method of multiple carbon-coated high-compaction lithium iron manganese phosphate, comprising the following steps:

(1) mixing an iron source, a manganese source, a phosphorus source, a carbon source and an additive, and then synthesizing a carbon and vanadium co-doped ferromanganese phosphate precursor through a co-precipitation; and sintering the obtained ferromanganese phosphate precursor, and removing all crystal water to obtain an anhydrous ferromanganese phosphate precursor;

(2) adding lithium phosphate, a supplemental phosphorus source, an organic carbon source, a dopant and deionized water into the anhydrous ferromanganese phosphate precursor obtained in step (1), and performing ball milling, wet sanding, spray drying and sintering to obtain an intermediate product; and (3) adding deionized water and the organic carbon source into the intermediate product obtained in step (2) again, performing ball milling, sanding, spray drying, sintering and air jet pulverization to finally obtain the multiple carbon-coated high-compaction lithium iron manganese phosphate material.

Preferably, in step (1), the iron source is ferrous sulfate, the manganese source is manganese sulfate, and the phosphorus source is one or more of phosphoric acid, ammonium dihydrogen phosphate and diammonium hydrogen phosphate, the additive is ammonium metavanadate, and the carbon source is citric acid; the iron source, the manganese source, the phosphorus source, carbon source and the additive are weighed based on a stoichiometric proportion of each element in $(Mn_xFe_yV_z)_2(PO_4)_3 \cdot mH_2O$, wherein $0.4<x<0.8$, $0.2\leq y\leq0.6$, and $0.0005<z<0.005$; the sintering is performed for 1-5 h in a box furnace at the sintering temperature of 380-680° C. at the sintering atmosphere of air.

Preferably, in step (2), a molar ratio of the intermediates is (Fc+Mn)/P=0.958-0.998, and a molar ratio is Li/(Fe+Mn)=1.025-1.055.

Preferably; in step (2), the organic carbon source is a mixture of glucose and polyethylene glycol, the addition amount of glucose is 4-6 wt % of the weight of the anhydrous ferromanganese phosphate precursor, and the addition amount of polyethylene glycol is 1-2 wt % of the weight of anhydrous manganese phosphate precursor; the dopant is one or more of titanium dioxide, ammonium metavanadate, niobium pentoxide and magnesium dioxide, and the addition amount of the dopant is 0-1.5 wt % of the weight of the anhydrous ferromanganese phosphate precursor; the supplemental phosphorous source is one or more of phosphoric acid, ammonium dihydrogen phosphate and diammonium hydrogen phosphate, and the addition amount of the supplemental phosphorous source is determined based on a molar ratio Fe/P=0.958-0.966 in multiple carbon-coated high-compaction lithium iron manganese phosphate.

Preferably, in step (2), the ball milling time is 0.5-2 h; in the wet sanding, the sanding granularity is controlled to D50=0.20-0.60 μm, and the solid content is controlled to 30-50 wt %; an inlet air temperature for spray drying is controlled to 180-240° C., an outlet air temperature for spray drying is controlled to 80-120° C.; the sintering is performed for 2-5 h in a box furnace at the sintering temperature of 400-550° C. at the sintering atmosphere of nitrogen.

Preferably; in step (3), the organic carbon source is one or more of glucose, saccharose, polyethylene glycol and polyvinyl alcohol, and the addition amount of the organic carbon source is determined based on 1.0-1.8 wt % of carbon content in multiple carbon-coated high-compaction lithium iron manganese phosphate; the ball milling time is 0.5-2 h, in the wet sanding, the sanding granularity is controlled to D50=0.30-0.50 μm, and the solid content is controlled to 40-60 wt %; an inlet air temperature for spray drying is controlled to 180-240° C., an outlet air temperature for spray drying is controlled to 80-120° C.; the sintering is performed for 6-15 h in a box furnace at the sintering temperature of 650-850° C. at the sintering atmosphere of nitrogen at the sintering pressure of 50-200 Pa; in the air jet pulverization, the particle size of the multiple carbon-coated high-compaction lithium iron manganese phosphate obtained by pulverization is D10≥0.30 μm, D50=1-2 μm and D90≤20 μm.

The present disclosure also provides a multiple carbon-coated high-compaction lithium iron manganese phosphate prepared by the method.

The present disclosure also provides a use of the multiple carbon-coated high-compaction lithium iron manganese phosphate in a lithium battery cathode material.

Compared with the prior art, the present disclosure has the beneficial effects:

1. the ferromanganese phosphate precursor synthesized by using a co-precipitation method is used as the manganese source and the iron source without individual lithium iron phosphate and lithium manganese phosphate phases so as to ensure the mixing uniformity of manganese and iron on microscale, twice ball milling and sanding processes ensure that the finally synthesized lithium iron manganese phosphate material has a uniform phase; the ferromanganese phosphate precursor and lithium phosphate are selected as main materials, their characteristics of mixing uniformity effectively ensure the purity of the material after sintering, thereby avoiding the generation of a heterophase.

2. Pretreatments, such as doping, coating and crystal water removal, are performed on the ferromanganese phosphate precursor, wherein doping can ensure in-situ doping with a better effect; coating carbon effectively ensures uniform particle size, better dispersity and lower impurity content; removal of crystal water avoids the hard agglomeration during the sintering.

3. The twice-sintering process not only ensures the growth of crystal grains and doping impurity ions in the process of primary sintering to guarantee compaction, but also guarantees that the carbon layer is coated so that the carbon coating effect is better, thereby improving the conductivity of lithium iron manganese phosphate.

DETAILED DESCRIPTION OF THE EMBODIMENTS

Figure 1:
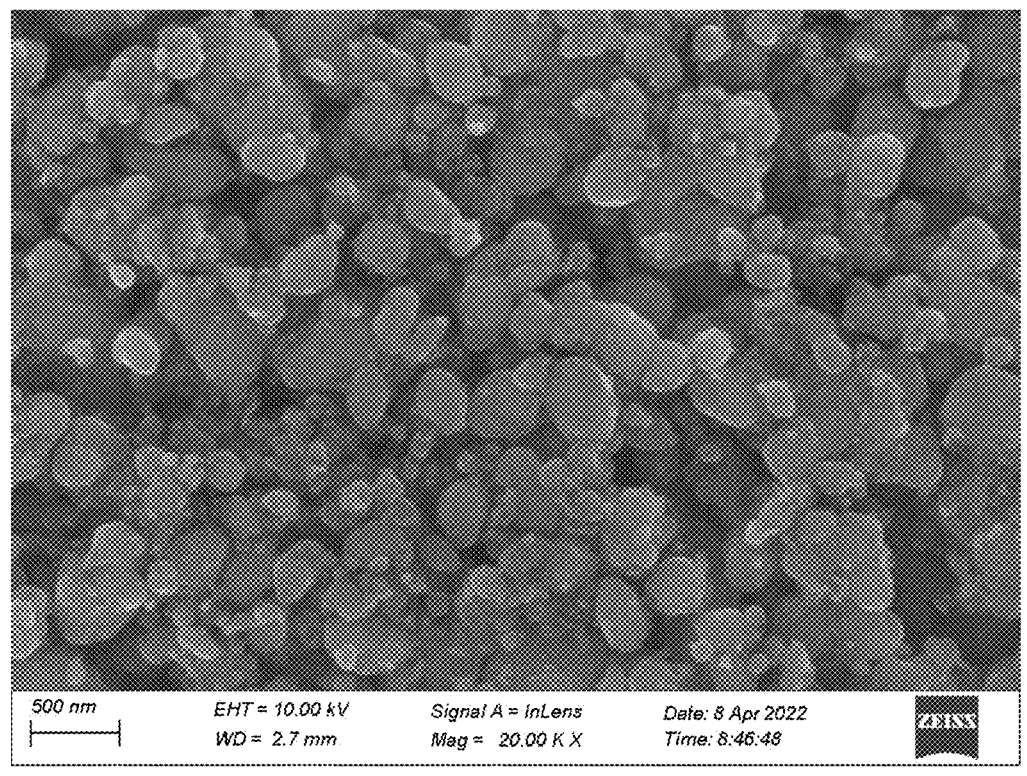
FIG. 1 is a scanning electron microscope (SEM) graph of a sample prepared in example 1.

For making the objective, technical solution of advantages of the present disclosure more clear, the present disclosure will be further described in detail in combination with specific embodiments. Of course, specific embodiments described herein are only for explaining the present disclosure, but not limiting the present disclosure.

Although the steps in the present disclosure are arranged with numbers, it is not for limiting the sequence of the steps of the present disclosure, unless otherwise specified, the order of the steps or implementation of some steps require other steps as a basic, or else, the relative order of the steps can be adjusted. It can be understood that the term "and/or" used herein involves and covers any and all possible combinations of one or more of associated listed items.

Unless otherwise specified, chemical reagents and materials in the present disclosure are purchased through the market or synthesized from raw materials purchased through the market.

Example 1

A preparation method of multiple carbon-coated high-compaction lithium iron manganese phosphate comprises the following steps:

(1) 778 g of ferrous sulfate, 1167 g of manganese sulfate, 35 g of phosphoric acid, 455 g of ammonium dihydrogen phosphate, 5 g of citric acid and 4 g of ammonium metavanadate were mixed, and a carbon and vanadium co-doped ferromanganese phosphate precursor whose chemical formula was $(Mn_{0.599}Fe_{0.4}V_{0.001})_2(PO_4)_3 \cdot 6H_2O$ was synthesized by a co-precipitation method; the obtained ferromanganese phosphate precursor was sintered for 5 h in a box furnace at the atmosphere of air at 400° C., and an anhydrous ferromanganese phosphate precursor was obtained after all crystal water;

(2) 313 g of lithium phosphate, 10 g of phosphoric acid, 36.5 g of glucose, 36.5 g of polyethylene glycol, 4.8 g of ammonium metavanadate and 3500 g of deionized water were added into 1000 g of anhydrous ferromanganese phosphate precursor obtained in step (1) and underwent ball milling for 0.5 h followed by wet sanding, wherein after sanding, the final particle size was controlled to D50=0.35 μm, and the solid content was controlled to 30 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 2 h in the box furnace at 550° C. at the atmosphere of nitrogen to obtain an intermediate product;

(3) 2000 g of deionized water, 36.5 g of glucose and 36.5 g of polyethylene glycol were continued to be added into the intermediate product obtained in step (2) and underwent ball milling for 0.5 h followed by sanding, wherein after sanding, the final particle size was controlled to D50=0.35 μm, and the solid content was controlled to 33 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 10 h in the box furnace at 760° C. at the atmosphere of nitrogen under the sintering pressure of 50 Pa; the product obtained after sintering was subjected to air pulverization, wherein the particle size was controlled to D10=0.40 μm, D50=1.5 μm and D90=10 μm, and then the multiple carbon-coated high-compaction lithium iron manganese phosphate material was finally obtained.

Example 2

A preparation method of multiple carbon-coated high-compaction lithium iron manganese phosphate comprises the following steps:

(1) 972.5 g of ferrous sulfate, 975 g of manganese sulfate, 37 g of phosphoric acid, 452 g of ammonium dihydrogen phosphate, 6 g of citric acid and 10 g of ammonium metavanadate were mixed, and a carbon and vanadium co-doped ferromanganese phosphate precursor whose chemical formula was $(Mn_{0.499}Fe_{0.5}V_{0.002})_2$ $(PO_4)_3 \cdot 6H_2O$ was synthesized by a co-precipitation method; the obtained ferromanganese phosphate precursor was sintered for 3 h in a box furnace at the atmosphere of air at 450° C., and an anhydrous ferromanganese phosphate precursor was obtained after all crystal water was removed;

(2) 313 g of lithium phosphate, 12 g of diammonium hydrogen phosphate, 32.5 g of glucose, 32.5 g of polyethylene glycol, 4.8 g of ammonium metavanadate, 5.2 g of titanium dioxide and 3000 g of deionized water were added into 1000 g of anhydrous ferromanganese phosphate precursor obtained in step (1) and underwent ball milling for 1 h followed by wet sanding, wherein after sanding, the final particle size was controlled to D50=0.3 μm, and the solid content was controlled to 35 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 3 h in the box furnace at 500° C. at the atmosphere of nitrogen to obtain an intermediate product;

(3) 2000 g of deionized water, 40.5 g of saccharose and 40.5 g of polyethylene glycol were continued to be added into the intermediate product obtained in step (2) and underwent ball milling for 1 h followed by sanding, wherein after sanding, the final particle size was controlled to D50=0.25 μm, and the solid content was controlled to 33 wt %; the obtained mixture was subjected to spray in drying, wherein an inlet air temperature for spray drying was controlled to 220° C., and an outlet air temperature for spray drying was controlled to 100° C.; the mixture obtained after spray drying was sintered for 12 h in the box furnace at 750° C. at the atmosphere of nitrogen under the sintering pressure of 80 Pa; the product obtained after sintering was subjected to air pulverization, wherein the particle size was controlled to D10=0.40 μm, D50=1.2 μm and D90=10 μm, and then the multiple carbon-coated high-compaction lithium iron manganese phosphate material was finally obtained.

Example 3

A preparation method of multiple carbon-coated high-compaction lithium iron manganese phosphate comprises the following steps;

(1) 583.5 g of ferrous sulfate, 1361.5 g of manganese sulfate, 39 g of phosphoric acid, 450 g of ammonium dihydrogen phosphate, 5 g of citric acid and 6 g of ammonium metavanadate were mixed, and a carbon and vanadium co-doped ferromanganese phosphate precursor whose chemical formula was $(Mn_{0.699}Fe_{0.3}V_{0.0015})_2(PO_4)_3 \cdot 6H_2O$ was synthesized by a co-precipitation method; the obtained ferromanganese phosphate precursor was sintered for 2 h in a box furnace at the atmosphere of air at 500° C., and an anhydrous ferromanganese phosphate precursor was obtained after all crystal water was removed;

(2) 313 g of lithium phosphate, 10 g of diammonium hydrogen phosphate, 30.5 g of glucose, 30.5 g of polyethylene glycol, 6.3 g of niobium pentoxide and 3000 g of deionized water were added into 1000 g of anhydrous ferromanganese phosphate precursor obtained in step (1) and underwent ball milling for 2 h followed by wet sanding, wherein after sanding, the final particle size was controlled to D50=0.25 μm, and the solid content was controlled to 35 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 2 h in the box furnace at 550° C. at the atmosphere of nitrogen to obtain an intermediate product;

(3) 1600 g of deionized water, 43.5 g of glucose and 43.5 g of polyethylene glycol were continued to be added into the intermediate product obtained in step (2) and underwent ball milling for 2 h followed by sanding, wherein after sanding, the final particle size was controlled to D50=0.20 μm, and the solid content was controlled to 33 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 8 h in the box furnace at 770° C. at the atmosphere of nitrogen under the sintering pressure of 150 Pa; the product obtained after sintering was subjected to air pulverization, wherein the particle size was controlled to D10=0.40 μm, D50=1.0 μm and D90=10 μm, and then the multiple carbon-coated high-compaction lithium iron manganese phosphate material was finally obtained.

Example 4

A preparation method of multiple carbon-coated high-compaction lithium iron manganese phosphate comprises the following steps:

(1) 1168 g of ferrous sulfate, 775 g of manganese sulfate, 39 g of phosphoric acid, 450 g of ammonium dihydrogen phosphate, 6 g of citric acid and 4 g of ammonium metavanadate were mixed, and a carbon and vanadium co-doped ferromanganese phosphate precursor whose chemical formula was $(Mn_{0.399}Fe_{0.6}V_{0.001})_2$ $(PO_4)_3 \cdot 6H_2O$ was synthesized by a co-precipitation method; the obtained ferromanganese phosphate precursor was sintered for 1 h in a box furnace at the atmosphere of air at 650° C., and an anhydrous ferromanganese phosphate precursor was obtained after all crystal water was removed;

(2) 313 g of lithium phosphate, 10 g of diammonium hydrogen phosphate, 36.5 g of glucose, 36.5 g of polyethylene glycol, 2.8 g of ammonium metavanadate and 3000 g of deionized water were added into 1000 g of anhydrous ferromanganese phosphate precursor obtained in step (1) and underwent ball milling for 1.5 h followed by wet sanding, wherein after sanding, the final particle size was controlled to D50=0.40 μm, and the solid content was controlled to 35 wt %; the obtained mixture was subjected to spray drying, wherein an inlet air temperature for spray drying was controlled to 220° C., and an outlet air temperature for spray drying was controlled to 90° C.; the mixture obtained after spray drying was sintered for 3 h in the box furnace at 500° C. at the atmosphere of nitrogen to obtain an intermediate product;

(3) 1600 g of deionized water, 36.5 g of saccharose and 36.5 g of polyethylene glycol were continued to be added into the intermediate product obtained in step (2) and underwent ball milling for 1.5 h followed by sanding, wherein after sanding, the final particle size was controlled to D50=0.40 μm, and the solid content was controlled to 33 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 10 h in the box furnace at 760° C. at the atmosphere of nitrogen under the sintering pressure of 200 Pa; the product obtained after sintering was subjected to air pulverization, wherein the particle size was controlled to D10=0.40 μm, D50=2.0 μm and D90=10 μm, and then the multiple carbon-coated high-compaction lithium iron manganese phosphate material was finally obtained.

Comparative Example 1

(1) 440 g of ferric phosphate and 390 g of manganese dioxide were mixed to obtain a ferromanganese phosphate precursor;

(2) 313 g of lithium phosphate, 10 g of diammonium hydrogen phosphate, 36.5 g of glucose, 36.5 g of polyethylene glycol, 2.8 g of ammonium metavanadate, 4.8 of titanium dioxide and 3000 g of deionized water were added into the anhydrous ferromanganese phosphate precursor obtained in step (1) and underwent ball milling for 0.5 h followed by wet sanding, wherein after sanding, the final particle size was controlled to D50=0.40 μm, and the solid content was controlled to 35 wt %; the obtained mixture was subjected to spray drying, wherein an inlet air temperature for spray drying was controlled to 220° C., and an outlet air temperature for spray drying was controlled to 90° C.; the mixture obtained after spray drying was sintered for 2 h in the box furnace at 550° C. at the atmosphere of nitrogen to obtain an intermediate product;

(3) 1600 g of deionized water, 36.5 g of glucose and 36.5 g of polyethylene glycol were continued to be added into the intermediate product obtained in step (2) and underwent ball milling for 0.5 h followed by sanding, wherein after sanding, the final particle size was controlled to D50=0.40 μm, and the solid content was controlled to 33 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 10 h in the box furnace at 760° C. at the atmosphere of nitrogen under the sintering pressure of 60 Pa; the product obtained after sintering was subjected to air pulverization, wherein the particle size was controlled to D10=0.40 μm, D50=2.0 μm and D90=10 μm, and then the multiple carbon-coated high-compaction lithium iron manganese phosphate material was finally obtained.

Comparative Example 2

(1) 778 g of ferrous sulfate, 1167 g of manganese sulfate, 35 g of phosphoric acid, 455 g of ammonium dihydrogen phosphate, 5 g of citric acid and 4 g of ammonium metavanadate were mixed, and a carbon and vanadium co-doped ferromanganese phosphate precursor whose chemical formula was $(Mn_{0.599}Fe_{0.4}V_{0.001})_2$ $(PO_4)_3 \cdot 6H_2O$ was synthesized by a co-precipitation method; the obtained ferromanganese phosphate precursor was sintered for 5 h in a box furnace at the atmosphere of air at 400° C., and an anhydrous ferromanganese phosphate precursor was obtained after all crystal water was removed;

(2) 313 g of lithium phosphate, 10 g of phosphoric acid, 10 g of glucose, 73 g of polyethylene glycol, 4.8 g of ammonium metavanadate and 3500 g of deionized water were added into 1000 g of anhydrous ferromanganese phosphate precursor obtained in step (1) and underwent ball milling for 1 h followed by wet sanding, wherein after sanding, the final particle size was controlled to D50=0.35 μm, and the solid content was controlled to 30 wt %; the obtained mixture was subjected to spray drying, wherein an inlet air temperature for spray drying was controlled to 220° C., and an outlet air temperature for spray drying was controlled to 100° C.; the mixture obtained after spray drying was sintered for 10 h in the box furnace at 760° C. at the atmosphere of nitrogen under the sintering pressure of 60 Pa; the product obtained after sintering was subjected to air pulverization, wherein the particle size was controlled to D10=0.40 μm, D50=1.5 μm and D90=10 μm, and then the lithium iron manganese phosphate material was finally obtained.

The lithium manganese iron phosphate cathode materials prepared from examples 1-4 and comparative examples 1-2 together with Super-P and polyvinylidene fluoride (PVDF) were dispersed into N-methylpyrrolidone (NMP) in a mass ratio of 80:10:10, the obtained mixture solution was evenly dispersed through ball milling, and then the obtained dispersed solution was coated onto aluminum foil and dried in vacuum to obtain a positive plate, wherein an electrolyte was 1 mol/L $LiPF_6$, a solvent volume ratio was EC:DMC: EMC=1:1:1 (volume ratio), a diaphragm was a Celgard polypropylene film, and a lithium metal sheet was an anode, and then the above materials were assembled into a button battery. A range of a test voltage is 2.5 V-4.5 V, the voltage is charged to 4.5 V in a constant-current constant-voltage manner, and the cut-off current is 0.02 C; the voltage is discharged to 2.5 V in a constant-current discharge manner. Test results are as shown in Table 1:

TABLE 1

| Basic performances of lithium manganese iron phosphate material | | | |
|---|---|---|---|
| | 0.1 C discharge gram capacity (mAh/g) | 1 C discharge gram capacity (mAh/g) | Powder compaction density (g/cm³) |
| Example 1 | 161.43 | 156.13 | 2.33 |
| Example 2 | 163.6 | 156.64 | 2.36 |
| Example 3 | 162.53 | 157.45 | 2.35 |
| Example 4 | 164.41 | 157.54 | 2.38 |
| Comparative example 1 | 149.88 | 133.72 | 2.22 |
| Comparative example 2 | 127.45 | 113.34 | 2.26 |

Figure 2:
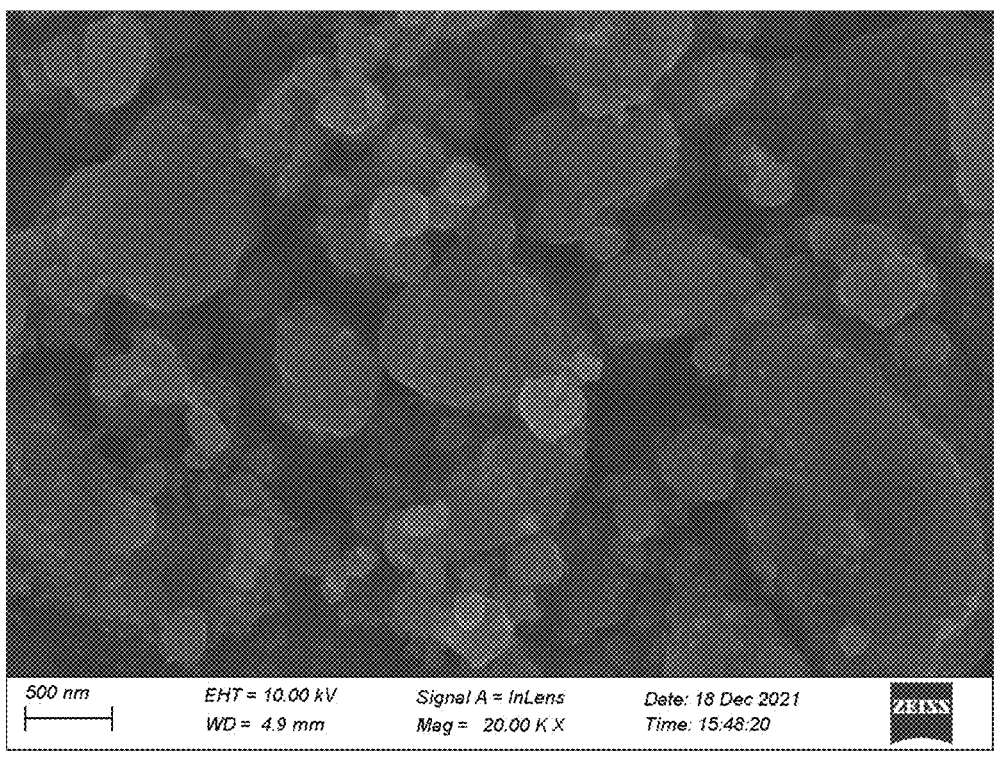
FIG. 2 is an SEM graph of a sample prepared in comparative example 1.
Figure 3:
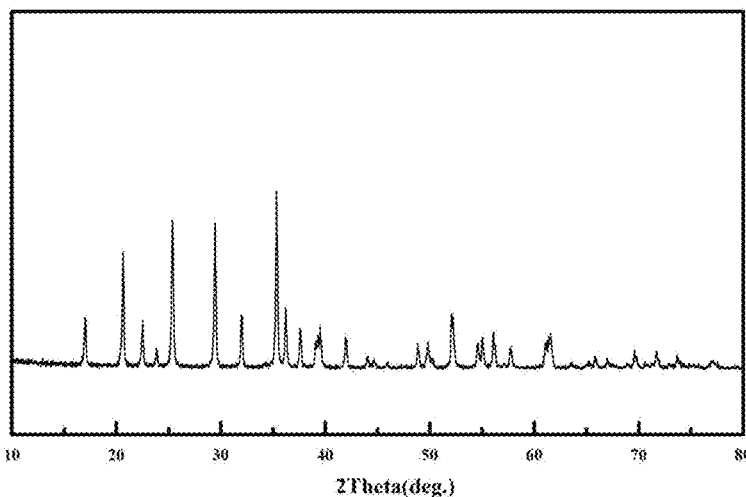
FIG. 3 is an X-ray diffraction (XRD) graph of a sample prepared in example 1.
Figure 4:
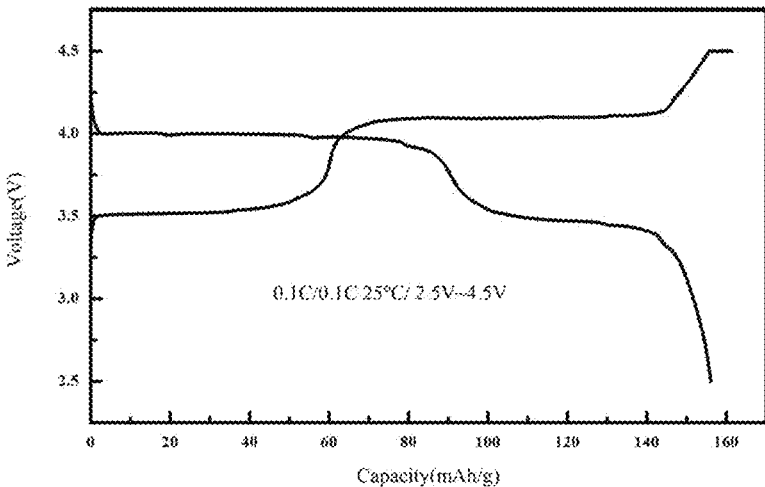
FIG. 4 is a charge-discharge curve graph of a sample button battery prepared in example 1.
Figure 5:
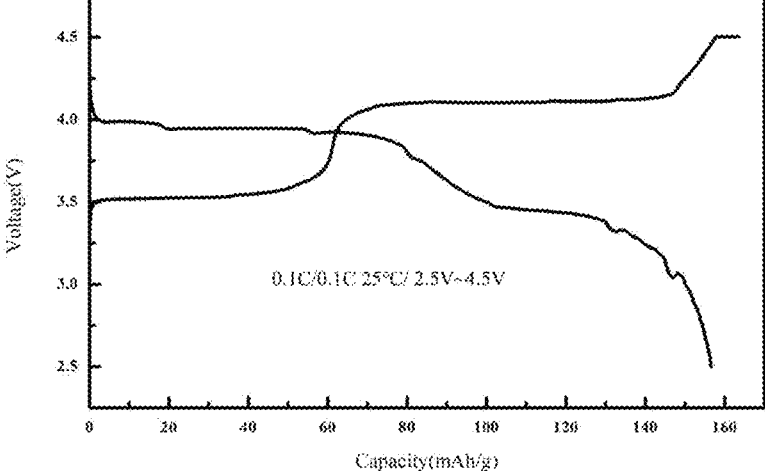
FIG. 5 is a charge-discharge curve graph of a sample button battery prepared in example 2.
Figure 6:
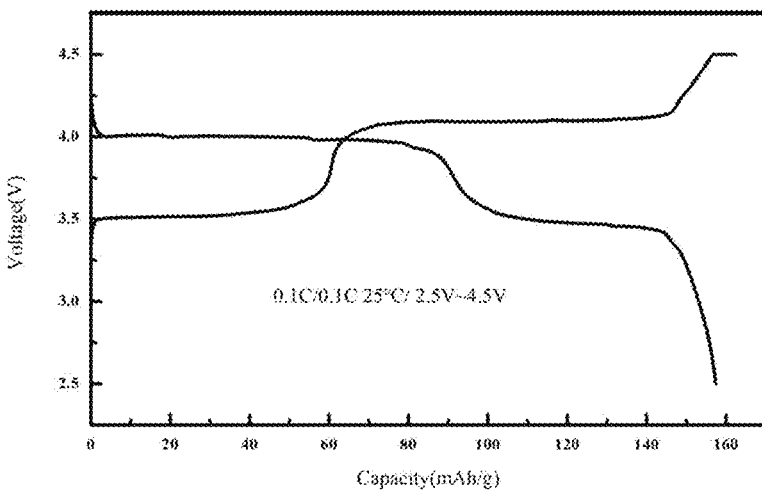
FIG. 6 is a charge-discharge curve graph of a sample button battery prepared in example 3.
Figure 7:
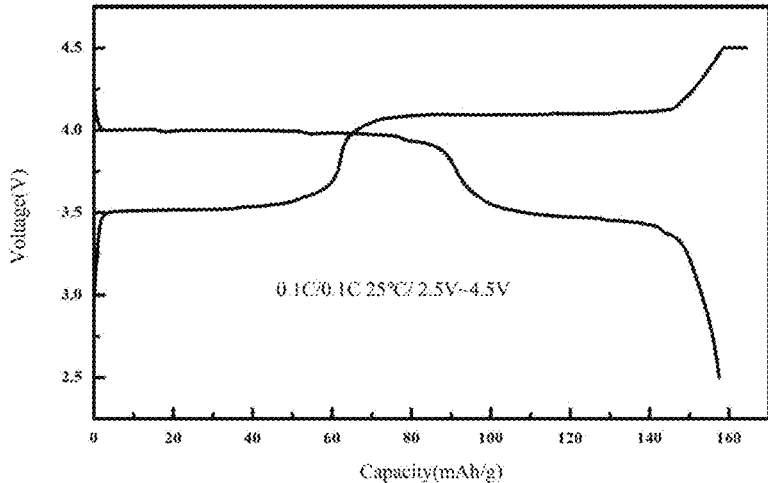
FIG. 7 is a charge-discharge curve graph of a sample button battery prepared in example 4.
Figure 8:
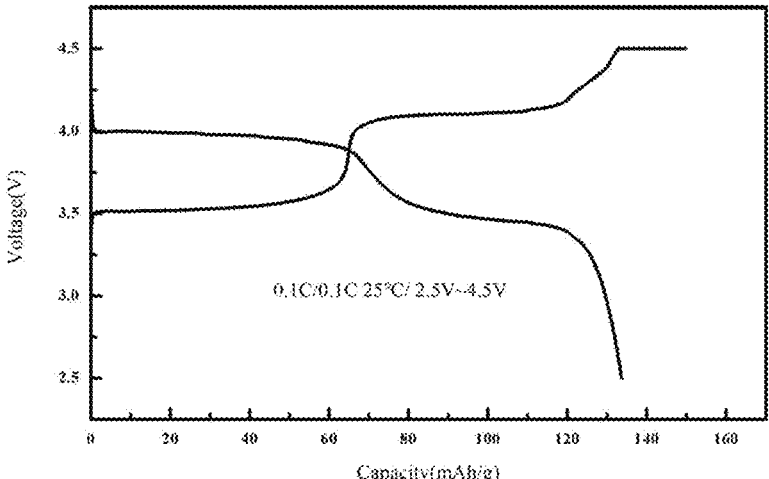
FIG. 8 is a charge-discharge curve graph of a sample button battery prepared in comparative example 1.
Figure 9:
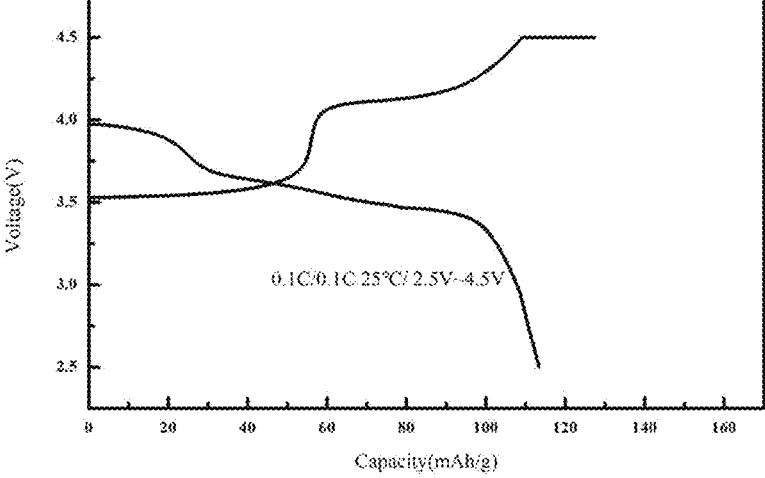
FIG. 9 is a charge-discharge curve graph of a sample button battery prepared in comparative example 2.

Examples 1-4 are multiple carbon-coated high-compaction lithium manganese iron phosphate prepared in the present disclosure, and comparative examples 1-2 are lithium manganese iron phosphate produced in conventional methods; it can be seen from data that the powder compaction density and discharge gram capacity of the multiple carbon-coated high-compaction lithium manganese iron phosphate prepared in the present disclosure are higher than those of lithium manganese iron phosphate produced in conventional methods; the products in example 1 and comparative example 1 are subjected to scanning electrode microscope analysis, the analysis pictures are as shown in FIGS. 1-2, it can be seen that the multiple carbon-coated high-compaction lithium manganese iron phosphate prepared in the present disclosure has uniform particle size and better uniformity.

Those skilled in the art should be understood that any improvements made to the present disclosure, equivalent replacements to various product raw materials in the present disclosure, addition of auxiliary components and selection of specific modes should fall within the protective scope and public scope of the present disclosure.

What is claimed is:

1. A preparation method of multiple carbon-coated high-compaction lithium iron manganese phosphate, comprising the following steps:

S1 mixing an iron source, a manganese source, a phosphorus source, a carbon source and an additive, and then synthesizing a carbon and vanadium co-doped ferromanganese phosphate precursor through a co-precipitation; and sintering the obtained carbon and vanadium co-doped ferromanganese phosphate precursor, and removing all crystal water to obtain an anhydrous ferromanganese phosphate precursor;

S2 adding lithium phosphate, a supplemental phosphorus source, an organic carbon source, a dopant and deionized water into the anhydrous ferromanganese phosphate precursor obtained in step S1 and performing ball milling, wet sanding, spray drying and sintering to obtain an intermediate product; and S3 adding deionized water and the organic carbon source into the intermediate product obtained in step S2 again, performing ball milling, sanding, spray drying, sintering and air jet pulverization to finally obtain the multiple carbon-coated high-compaction lithium iron manganese phosphate material.

2. The preparation method according to claim 1, wherein in step S1, the iron source is ferrous sulfate, the manganese source is manganese sulfate, and the phosphorus source is one or more of phosphoric acid, ammonium dihydrogen phosphate and diammonium hydrogen phosphate, the additive is ammonium metavanadate, and the carbon source is citric acid; the iron source, the manganese source, the phosphorus source, the carbon source and the additive are weighed based on a stoichiometric proportion of each element in $(Mn_xFe_yV_z)_2(PO_4)_3 \cdot mH_2O$ and then mixed, wherein $0.4<x<0.8$, $0.2 \leq y \leq 0.6$, and $0.0005<z<0.005$; the sintering is performed for 1-5 h in a box furnace at the sintering temperature of 380-680° C. at the sintering atmosphere of air.

3. The preparation method according to claim 1, wherein in step S2, the intermediate product satisfies a molar ratio of the intermediate product is (Fe+Mn)/P=0.958-0.998, and a molar ratio is Li/(Fe+Mn)=1.025-1.055.

4. The preparation method according to claim 1, wherein in step S2, the organic carbon source is a mixture of glucose and polyethylene glycol, the addition amount of glucose is 4-6 wt % of the weight of the anhydrous ferromanganese phosphate precursor, and the addition amount of polyethylene glycol is 1-2 wt % of the weight of anhydrous manganese phosphate precursor; the dopant is one or more of titanium dioxide, ammonium metavanadate, niobium pentoxide and magnesium dioxide, and the addition amount of the dopant is 0-1.5 wt % of the weight of the anhydrous ferromanganese phosphate precursor; the supplemental phosphorous source is one or more of phosphoric acid, ammonium dihydrogen phosphate and diammonium hydrogen phosphate, and the addition amount of the supplemental phosphorous source is determined based on the molar ratio Fe/P=0.958-0.966 in the multiple carbon-coated high-compaction lithium iron manganese phosphate.

5. The preparation method according to claim 1, wherein in step S2, the ball milling time is 0.5-2 h; in the wet sanding, the sanding granularity is controlled to D50=0.20-0.60 μm, and the solid content is controlled to 30-50 wt %; an inlet air temperature for spray drying is controlled to 180-240° C., an outlet air temperature for spray drying is controlled to 80-120° C.; the sintering is performed for 2-5 h in a box furnace at the sintering temperature of 400-550° C. at the sintering atmosphere of nitrogen.

6. The preparation method according to claim 1, wherein in step S3, the organic carbon source is one or more of glucose, saccharose, polyethylene glycol and polyvinyl alcohol, and the addition amount of the organic carbon source is determined based on 1.0-1.8 wt % of carbon content in the multiple carbon-coated high-compaction lithium iron manganese phosphate; the ball milling time is 0.5-2 h, in the wet sanding, the sanding granularity is controlled to D50=0.30-0.50 μm, and the solid content is controlled to 40-60 wt %; an inlet air temperature for spray drying is controlled to 180-240° C., an outlet air temperature for spray drying is controlled to 80-120° C.; the sintering is carried out for 6-15 h in a box furnace at the sintering temperature of 650-850° C. at the sintering atmosphere of nitrogen at the sintering pressure of 50-200 Pa; in the air jet pulverization, the particle size of the multiple carbon-coated high-compaction lithium iron manganese phosphate obtained by pulverization is D10≥0.30 μm, D50=1-2 μm and D90≤20 μm.

* * * * *